March 13, 1962  R. KUTSMICHEL  3,024,825
PNEUMATIC TYRES

Filed Sept. 17, 1959  2 Sheets-Sheet 1

Inventor
Rudolf Kutsmichel
by Benj. T. Rauber
his attorney

March 13, 1962  R. KUTSMICHEL  3,024,825
PNEUMATIC TYRES

Filed Sept. 17, 1959  2 Sheets-Sheet 2

Inventor
Rudolf Kutsmichel
by Benj. T. Rauber
his attorney

United States Patent Office 3,024,825
Patented Mar. 13, 1962

3,024,825
PNEUMATIC TYRES
Rudolf Kutsmichel, Hanau (Main), Germany, assignor to Dunlop Rubber Company Limited, London, England
Filed Sept. 17, 1959, Ser. No. 840,688
Claims priority, application Germany Sept. 23, 1958
11 Claims. (Cl. 152—209)

This invention relates to pneumatic tyres, and more particularly to improvements in non-slip tread patterns for pneumatic tyres.

According to the invention a pneumatic tyre has a tread portion comprising in each shoulder region a pair of side-by-side circumferential road gripping elements, each having transversely-extending projections and indentations, the projections of one road gripping element projecting into corresponding indentations in the other road gripping element, and the radial height with respect to the centre of curvature of the crown of the tyre tread of one road gripping element being greater than that of the other road gripping element.

In the case of a tyre for a vehicle having more than one track, such as a motor car, the road gripping element nearer to the sidewall of the tyre is preferably of a lower radial height with respect to the centre of curvature of the crown of the tyre tread than that of the road gripping elements nearer the center line of the tyre.

In the case of a tyre for a vehicle having a single track, such as a motor cycle, the road gripping element nearer to the sidewall of the tyre is preferably of a greater radial height with respect to the centre of curvature of the crown of the tyre tread than that of the road gripping element nearer the center line of the tyre.

The road gripping elements may all be either circumferential ribs or rows of blocks, or in each shoulder region one of the road gripping elements may be a circumferential rib and the other element a row of blocks.

Four embodiments of the invention are illustrated in the accompanying drawings, in which.

Figure 1:
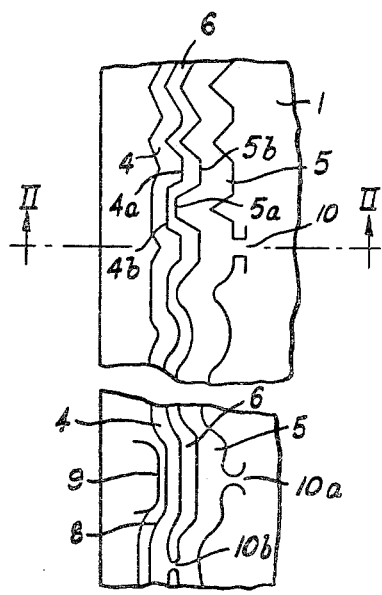
FIGURE 1 is a developed plan view showing two parts of a tyre tread according to the invention.
Figure 2:
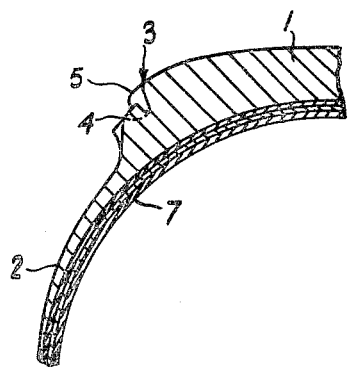
FIGURE 2 is a cross-sectional view taken on the line II—II of FIGURE 1.

FIGURES 1 and 2 show part of a tyre having a tread 1, the tread 1 having a transverse curvature, i.e. a crown (see FIGURE 2), sidewall 2, and shoulder region 3. The shoulder region 3 is provided with a pair of ribs 4 and 5 separated by a groove 6, each rib running circumferentially around the tyre and the ribs having a plurality of transversely extending projections 4a and 5a, respectively. The projections 4a of the rib 4 extend into corresponding indentations 5b of the rib 5, and the projections 5a of the rib 5 extend into indentations 4b of the rib 4. The edge 8 of the rib 4 stands outwardly from the carcass 7 beyond the shoulder buttresses 9 which extend from the sidewall 2 to the shoulder region 3, and the rib 5 is joined to the tread 1 by means of bridging portions 10, 10a. The ribs 4 and 5 are joined together at points distributed around the circumference of the tyre by bridging portions 10b (see FIGURE 1).

The radial height, with respect to the centre of curvature of the crown of the tyre tread, of the rib 5 is greater than that of the rib 4, the rib 5 standing out further from the carcass than the rib 4. The projections 4a thus do not touch the road surface when a vehicle to which the tyre is fitted is running along a straight flat road, but only come into contact with the road surface when the vehicle is travelling in a curved or transversely sloping path and the tread is distorted sufficiently to force the rib 5 to one side. This feature is advantageous in improving the cornering properties of the tyre, since the rib 4 is not worn during straight-ahead running of the tyre, and thus provides improved grip on cornering, throughout the life of the tyre.

Figure 3:
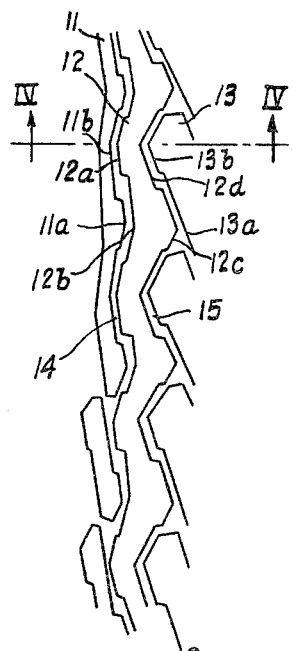
FIGURE 3 is a developed plan view of part of a tyre tread having an alternative pattern to the tread shown in FIGURE 1.
Figure 4:
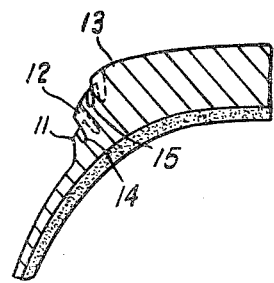
FIGURE 4 is a cross-sectional view taken on the line IV—IV of FIGURE 3.

FIGURES 3 and 4 show an alternative shoulder pattern to that shown in FIGURES 1 and 2. In this instance three ribs, or series of blocks 11, 12 and 13, separated by grooves 14 and 15, are provided, the series of blocks 11 being of lower radial height with respect to the centre of curvature of the crown of the tyre tread than the rib 12 and the rib 12 being of lower radial height than that of the series of blocks 13 (see FIGURE 4). The series of blocks 11 is provided with projections 11a which extend into corresponding indentations 12b in the rib 12, and indentations 11b into which corresponding projections 12a from the rib 12 extend. The rib 12 is also provided with projections 12c and indentations 12d, and the series of blocks 13 with indentations 13a and projections 13b, the projections 12c and 13b projecting respectively into the indentations 13a and 12d.

Figure 5:
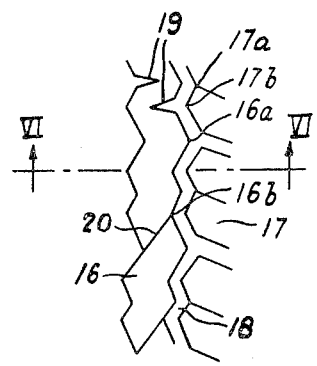
FIGURE 5 is a developed plan view of part of a tyre tread having a further alternative tread pattern.
Figure 6:
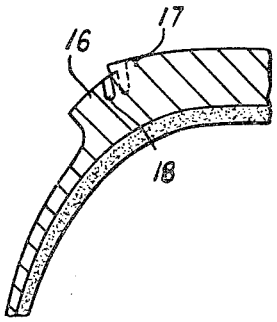
FIGURE 6 is a cross-sectional view taken on the line VI—VI of FIGURE 5.

FIGURES 5 and 6 show another alternative shoulder pattern to those described above, comprising a rib 16 and a series of blocks 17, separated by a groove 18. The rib 16 is provided with projections 16a and indentations 16b, and the series of blocks 17 has corresponding indentations 17a and projections 17b respectively. The rib 16 is also provided with a plurality of notches 19 and knife cuts 20 to enhance the grip of this rib when it becomes operative, e.g. on cornering.

Figure 7:
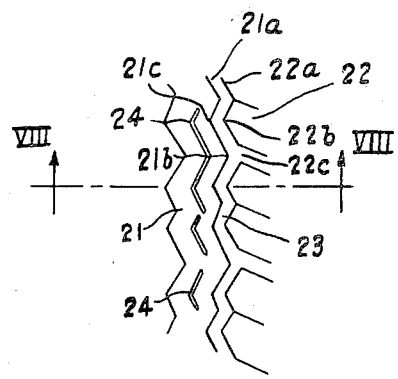
FIGURE 7 is a developed plan view of part of a tyre tread having a yet further alternative tread pattern.
Figure 8:
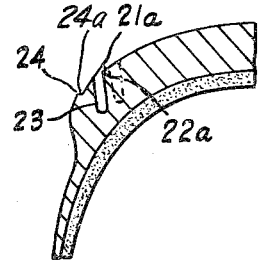
FIGURE 8 is a cross-sectional view taken on the line VIII—VIII of FIGURE 7.

The tyre which is illustrated in FIGURES 7 and 8 comprises a rib 21 and series of blocks 22 separated by a groove 23, and differs from the constructions of the preceding examples in that the edge 21a of the rib 21, which is nearer to the sidewall than the series of blocks 22, has a greater radial height with respect to the centre of curvature of the crown of the tyre tread than that of the adjacent edge 22a of the series of blocks 22. A series of zig-zag shoulders 24 is formed on the rib 21 to improve the grip of this rib on the road during cornering. The shoulders 24 extend generally in a circumferential direction, and on their axially innermost sides they are each provided with a face 24a which extends substantially radially inwardly with respect to the centre of curvature of the crown of the tyre tread.

The rib 21 is provided, respectively, with projections 21b and indentations 21c and the series of blocks 22 is provided with projections 22b and indentations 22c. The projections and indentations of the rib 21 and series of blocks 22 are arranged similarly to those of the preceding examples.

The tyre illustrated in FIGURES 7 and 8 is intended for use on a single track vehicle, such as a motor cycle, in which case the tyre is more sharply banked on curves than in the case of a tyre on a multitrack vehicle. The tyre illustrated in FIGURES 7 and 8 provides good adhesion on cornering and stability when travelling over rails or longitudinal joints in a road surface.

In the examples described above, the projections and indentations are preferably irregularly spaced around the tyre circumference in order to reduce noise.

Having now described my invention, what I claim is:

1. A pneumatic tyre having a tread portion comprising in each shoulder region a pair of side-by-side circumferentially extending road gripping elements, each having transversely extending projections and indentations, the projections of one of the circumferentially extending road gripping elements projecting into corresponding indentations in the other circumferentially extending road gripping elements and the radial height with respect to the centre of curvature of the tyre tread of substantially the whole of the radially outermost surface of one of the circumferentially extending road gripping elements in each shoulder being greater than that of the whole of the radially outermost surface of the other circumferentially extending road gripping elements in the same shoulder.

2. A pneumatic tyre according to claim 1 wherein in each shoulder region substantially the whole of the radially outermost surface of the one of the pair of road gripping elements nearer to the sidewall of the tyre is of lower radial height with respect to the centre of curvature of the crown of the tyre tread than that of the other of the pair of road gripping elements.

3. A pneumatic tyre according to claim 1 wherein a third circumferentially extending road gripping element is provided in each shoulder region in side-by-side relationship with one of the pair of gripping elements, substantially the whole of the outermost surface of each of the two axially outermost road gripping elements in each shoulder region being disposed at a lower radial height with respect to the center of curvature of the crown of the tyre than that of its adjacent axially inner road gripping element.

4. A pneumatic tyre according to claim 1 wherein in each shoulder region substantially the whole of the radially outermost surface of the one of the pair of road gripping elements nearer to the sidewall of the tyre is of a greater radial height with respect to the centre of curvature of the crown of the tyre tread than that of the other of the pair of road gripping elements.

5. A pneumatic tyre according to claim 1 wherein the pair of road gripping elements in each shoulder region are joined to one another by bridging portions.

6. A pneumatic tyre according to claim 1 wherein the axially innermost element of the pair of road gripping elements in each shoulder region is joined by bridging portions to the central portion of the tyre tread.

7. A pneumatic tyre according to claim 1 wherein the radially outermost surface of at least one of the pair of the road gripping elements in each shoulder region is provided with a shoulder extending generally in the circumferential direction of the tyre and having on the axially innermost side of the shoulder a face extending substantially radially with respect to the centre of curvature of the crown of the tyre tread.

8. A pneumatic tyre according to claim 1 wherein at least one of the pair of road gripping elements in each shoulder region is severed at least in part.

9. A pneumatic tyre according to claim 1 wherein at least one of the pair of the road gripping elements in each shoulder region is a rib.

10. A pneumatic tyre according to claim 1 wherein at least one of the pair of the road gripping elements in each shoulder region is a row of blocks.

11. A pneumatic tyre according to claim 1, wherein in each shoulder region one of the pair of the road gripping elements in each shoulder region is a rib and the other road gripping element is a row of blocks.

References Cited in the file of this patent

UNITED STATES PATENTS

| | | |
|---|---|---|
| D. 169,914 | Roberts | June 23, 1953 |
| 1,267,738 | Beldam | May 28, 1918 |
| 1,343,154 | Ostmann | June 8, 1920 |
| 1,618,823 | Hale | Feb. 22, 1927 |
| 1,662,599 | Brown | Mar. 13, 1928 |

FOREIGN PATENTS

| | | |
|---|---|---|
| 32,314 | France | June 14, 1927 |
| | (1st addition to No. 590,881) | |
| 993,870 | France | July 25, 1951 |
| 802,268 | Great Britain | Oct. 1, 1958 |